US012770126B2

(12) United States Patent
Waite

(10) Patent No.: US 12,770,126 B2
(45) Date of Patent: Oct. 20, 2026

(54) AUTONOMOUS MOBILE VENDING, CARD AND TICKET ISSUANCE SYSTEM

(71) Applicant: Real Life Robotics Inc., Cambridge (CA)

(72) Inventor: Cameron Waite, Cambridge (CA)

(73) Assignee: Real Life Robotics Inc., Kitchener (CA)

(*) Notice: Subject to any disclaimer, the term of this patent is extended or adjusted under 35 U.S.C. 154(b) by 0 days.

(21) Appl. No.: 18/743,913

(22) Filed: Jun. 14, 2024

(65) Prior Publication Data

US 2024/0420108 A1 Dec. 19, 2024

Related U.S. Application Data

(60) Provisional application No. 63/508,014, filed on Jun. 14, 2023.

(51) Int. Cl.

| | |
|---|---|
| ***G06Q 20/20*** | (2012.01) |
| ***G06K 7/10*** | (2006.01) |
| ***G06Q 20/40*** | (2012.01) |

(52) U.S. Cl.

CPC ....... *G06Q 20/208* (2013.01); *G06K 7/10366* (2013.01); *G06Q 20/209* (2013.01); *G06Q 20/40145* (2013.01)

(58) Field of Classification Search

CPC ............... G06Q 20/208; G06Q 20/209; G06Q 20/40145; G06Q 20/3224; G06Q 20/18; G06Q 20/204; G06Q 20/342; G06Q 20/355; G06Q 20/401; G06K 7/10366; G07F 9/001; G07F 9/0235; G07F 9/105; G07F 17/42; G07G 1/009; G07G 1/01; G07G 5/00

See application file for complete search history.

(56) References Cited

U.S. PATENT DOCUMENTS

| | | | | |
|---|---|---|---|---|
| 9,535,421 | B1 | 1/2017 | Canoso et al. | |
| D882,660 | S | 4/2020 | Jafarzadeh et al. | |
| D882,661 | S | 4/2020 | Jafarzadeh et al. | |
| D883,354 | S | 5/2020 | Jafarzadeh et al. | |
| 11,036,236 | B2 | 6/2021 | Janssen et al. | |
| 11,400,596 | B2 | 8/2022 | Liivik et al. | |
| 11,538,302 | B2 | 12/2022 | Huang et al. | |
| 11,681,295 | B2 | 6/2023 | Jang et al. | |
| 11,826,182 | B2 * | 11/2023 | Mann | A47B 67/02 |

(Continued)

*Primary Examiner* — Michael Jared Walker

(74) *Attorney, Agent, or Firm* — Own Innovation; James W. Hinton; Sanjeevan Shivakumar

(57) ABSTRACT

Provided is an autonomous mobile vending robot for point-of-sale, last-mile delivery, card issuance and ticket issuance operations. The robot includes a secure storage compartment that is configurable for various applications. The secure storage compartment may be insulated and include a heating system or a refrigeration system for mobile vending and delivery of food or drink items. According to various embodiments, the robot may include sensors and a card reader configured to verify the identity and age of users to dispense restricted items (e.g., alcohol, tobacco, recreational drugs). For mobile card issuance operations, the storage compartment houses programmable credit/gift cards and card-writing components to activate and program the cards for dispensing to users. The storage compartment may house a secure printer and ticket paper for mobile issuance of lottery/raffle tickets.

17 Claims, 5 Drawing Sheets

(56) References Cited

U.S. PATENT DOCUMENTS

| | | | | |
|---|---|---|---|---|
| 2006/0290471 | A1* | 12/2006 | Van Alstyne .......... | G06Q 10/08 340/572.1 |
| 2009/0320106 | A1* | 12/2009 | Jones ..................... | G06Q 40/02 726/5 |
| 2011/0316952 | A1* | 12/2011 | Sugiura .................. | B41J 15/042 242/598 |
| 2016/0252893 | A1* | 9/2016 | Kamyshnikov ...... | G06Q 20/108 700/231 |
| 2021/0165413 | A1 | 6/2021 | Guo et al. | |
| 2021/0304559 | A1* | 9/2021 | Cupersmith ............ | G07F 17/42 |
| 2021/0327203 | A1* | 10/2021 | Shah ....................... | G06F 21/32 |
| 2021/0330119 | A1 | 10/2021 | Väin et al. | |
| 2022/0019213 | A1 | 1/2022 | Kashani et al. | |
| 2022/0221870 | A1 | 7/2022 | Zimmermann | |
| 2022/0281117 | A1 | 9/2022 | Hani et al. | |
| 2023/0140923 | A1 | 5/2023 | Medeiros et al. | |
| 2023/0267792 | A1* | 8/2023 | Kawata ................... | G07F 11/46 700/232 |

* cited by examiner

AUTONOMOUS MOBILE VENDING, CARD AND TICKET ISSUANCE SYSTEM

TECHNICAL FIELD

The embodiments disclosed herein relate to vending and delivery systems, and, in particular to an autonomous mobile vending and card issuance system.

INTRODUCTION

Retail food and beverage companies (restaurants, golf courses, vending services companies, food service suppliers) are struggling to find consistent labor for food and beverage services. Labor fulfilment is a major challenge in their operations due to high turnover, increasing labor costs, inconsistent output, and inability to scale are all playing a part in the challenge. As a result, companies are exploring automation as a way to fill the labor gap. In addition, companies are exploring ways to enhance existing margin on sales, while creating additional sources of revenue.

Companies are always looking for new ways to reach clients and meet growing demand for products that are delivered directly to consumers. With consumer habits changing and focus more on e-commerce and home delivery, this problem includes high delivery costs due to labor issues, high operational costs due to increasing input prices like fuel and insurance, and the non-scalable nature of a traditional delivery service. Companies are also affected by pressures to innovate and support initiatives that have a positive environmental impact.

The credit card services market was valued at $443.67 billion in 2021, and is estimated to reach $952.2 billion by 2031. By issuers, the bank segment dominates the global market, and is estimated to reach $529.79 billion by 2031, with a CAGR of 6.6%. However, the Non-Bank Financial Companies (NBFC) segment is expected to be the fastest growing segment with a CAGR of 12.2% during the same forecast period. For NBFC credit card issuances, clients are generally directed to complete an information form, where credit is reviewed and issued either immediately (via online system) and a physical card is mailed to the client, or the client completes a paper form (i.e. at a point-of-sale retail location) and credit is then reviewed and a physical card is issued and delivered via mail.

Similar to credit cards, currently, gift card processing is done at a card retailer or at an authorized retail location that often aggregates a large number of retail outlet gift cards. No existing mobile credit/gift card issuance solution exists to actively engage with potential clients with targeted, immediate capabilities. The ability to issue immediate credit approval and a physical credit/gift card would dramatically increase the adoption rate and improve on the ability for new customers to utilize their card. In a variety of retail locations and environments, this creates the opportunity for immediate point-of-sale transactions to increase.

Accordingly, there is a need for a solution whereby customers can engage with, and purchase product from a "last mile delivery" mobile robot that has the potential to issue physical credit and/or gift cards to unlock previously uncaptured revenue, while also solutioning a growing labor problem.

SUMMARY

Described herein is an autonomous mobile vending and card issuance system. The system can actively engage with clients located indoors (corporate buildings, convention centers, malls/retail operations, office buildings, hospitals/healthcare operations, hotels/hospitality operations, sports arenas, etc.) or outdoors (streets, festivals/concerts, golf courses, parks, amusement park operations, etc.) and can offer multiple solutions depending on the operation.

According to various embodiments, the system allows for onboard storage of retail goods (e.g., food/beverages, clothing, supplies, etc.) and automatic dispensing of those goods upon authorized and approved payment interaction. A credit issuance aspect of the mobile vending system allows for issuance of loaded credit cards, in real time, by the mobile platform itself, upon authorized and approved credit identification process. Gift card issuance allows for real-time issuance of retail pre-loaded (optionally branded) gift cards (from a proprietary card loading and management system) upon successful authorized and approved payment interaction.

According to some embodiments, there is a mobile vending robot. The mobile vending robot comprises a first plurality of sensors configured for directing the robot to autonomously navigate an environment, a chassis including a secure storage compartment for storing items, a touchscreen interface for displaying information to a user and receiving user input, a payment interface for connecting to a payment system to process point-of-sale transactions and at least a second sensor configured for identifying a customer.

The robot is configured to receive a signal from a customer device summoning the robot to the customer, the signal including an identifier of the customer and a location, navigate to the location, identify the customer by the second sensor, receive customer input via the touchscreen interface for a point of sale-transaction, transmit payment information received via the payment interface to the payment system and receive confirmation of payment from the payment system. The robot may be further configured to provide access to the storage compartment upon receiving the confirmation of payment.

According to various embodiments, the secure storage compartment is insulated and further comprises a refrigeration system or a heating system. The robot may further comprise an RFID scanner configured to scan RFID tags on items stored in the storage compartment for inventory tracking. The robot may be configured to confirm an item is removed from the storage compartment by scanning the RFID tag on the item and end access to the storage compartment.

According to an embodiment, the storage compartment houses a card storage system for dispensing of programmable credit/gift cards. The card storage system comprises a rack for storing activatable cards and magnetic and/or RFID card writing components for activating and programming an activatable card with a pre-authorized amount of funds. The robot may be configured to activate and program the activatable cards with a pre-authorized amount of funds when approved by the payment system and dispense the activated card through a slot in the chassis.

According to an embodiment, the storage compartment houses a printer and a roll of ticket paper for printing lottery/raffle tickets. The printer is substantially immovably fixed to the robot's chassis and comprises a security system configured to permanently disable the printer if tampering is detected. The robot may be configured to print a ticket when approved by the payment system and dispense the ticket through a slot in the chassis.

According to some embodiments, the mobile vending robot further comprises a card reader configured for scanning an identification card for vending of restricted products (e.g., alcohol, Tabacco, recreational drugs). According to some embodiments, the at least second sensor is a camera configured for facial recognition. The robot may be configured to confirm a user's face captured by the camera matches an image on the identification card. According to an embodiment, the camera is configured to stream video and/or images captured by the camera to a remote operator for confirmation of the user's identity.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1A:
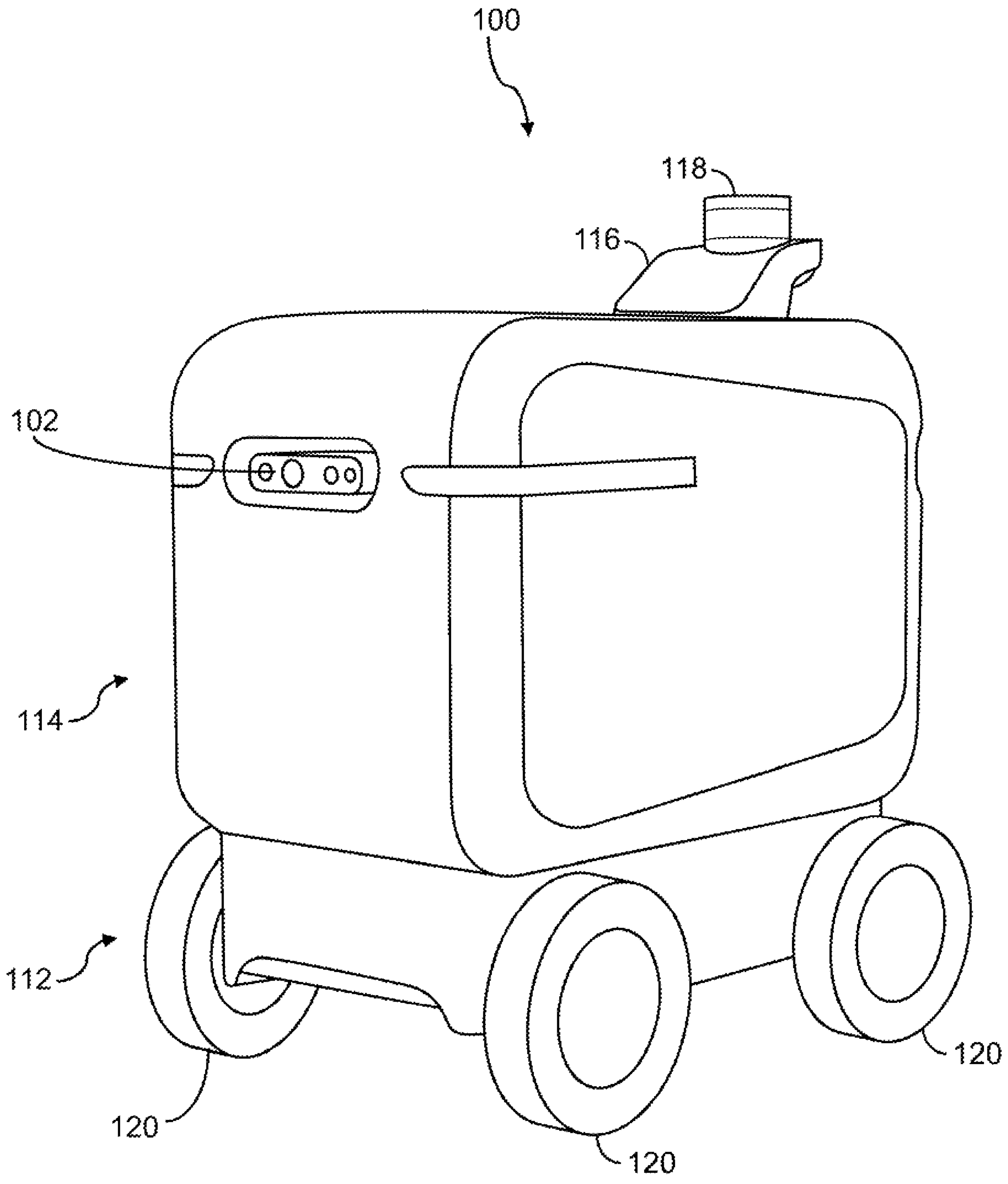
FIG. 1A is an autonomous mobile vending robot, according to an embodiment

Referring to FIG. 1A, shown therein is an autonomous mobile vending robot 100, according to an embodiment. The robot 100 is an autonomous mobile vending/delivery platform that is configurable by integration of various hardware, sensors and software to operate in particular environments and/or for vending/delivery of particular items as described below. A sensor payload 102 of the robot 100 is customized to be integrated with the overall robot 100 such that any power, data, or other software integration is customized to work with the robot 100 as an integrated system. Generally the sensor payload 102 is configured to provide a 360-degree view of the environment the robot 100 is operating in.

The robot 100 is configured to turn specific sensors on or off depending on the quality of the signal from the sensor in particular operating environments (indoor vs. outdoor; rural vs. urban) or under different operating conditions (daytime vs. nighttime). The robot 100 is configured to weight the energy consumption vs benefits of including the sensor data (e.g., turn off video cameras in dark areas) in sensor fusion for localization, obstacle avoidance, navigation, etc. and is configured to be robust to gaining or losing data from a subset of sensors while maintaining safe operations of the robot 100. The robot 100 includes an operating system that works across the sensory inputs from the sensor payload, incoming data from remote sources (servers, databases, maps, etc.) and local sources, and domain knowledge provided by clients/experts in the specific application.

Each sensor interface has a cost/benefit optimization running in the background that determines if it should be used or not. Primarily, this is based on the quality of incoming signal/data vs power consumption and computing demands. Based on which sensors are active, the sensor fusion policy activates one of a variety of different weighted kalman-filter-based state estimation algorithms (e.g., UKF/EKF/etc.) to incorporate the current belief about the state (location, speed, etc.) of the robot 100 along with the incoming sensor data to provide a statistically most likely prediction about the revised state of the robot.

The robot 100 includes a chassis 114. The chassis 114 houses a storage compartment for securely storing items for mobile vending, dispensing and/or last mile delivery.

A touchscreen interface 116 is disposed on the chassis 114. A user/customer can interact with the robot 100 via the touchscreen interface 116. The touchscreen interface 116 is configured for displaying information, instructions and prompts to the user and receiving user input. According to some embodiments, a user-facing camera may be integrated with the touchscreen interface 116 such that the touchscreen interface 116 displays the camera view to the user.

The robot 202 includes a payment interface 118. The payment interface 118 is configured to connect to a third-party payment system (e.g., payment system 204) for processing payments in point-of-sale purchases. According to various embodiments, the payment interface 118 may be one or more of: a NFC touchpad configured for "tap" payments or a pin pad with a magnetic strip reader, or a combination thereof. According to some embodiments, the payment interface 118 may be combined with the touchscreen interface 116.

The robot 100 includes a wheelbase 112 having a powertrain (e.g., one or more motors, drive shafts, axles, etc.) coupled to the wheels 120 to provide the robot 100 with mobility. According to various embodiments, the wheels 120 may be configured specifically for the robot 100 to operate in indoor environments, in outdoor environments (including off-road) or a combination of indoor/outdoor environments. According to some embodiments, the robot 100 includes legs (not shown), instead of wheels 120, configured for navigating uneven terrain and climbing stairs.

The chassis 114 and the wheelbase 112 may be weatherproofed (e.g., IP67 complaint) for operation in wide range of temperatures (e.g., −20 to 55 degrees Celsius) and wet conditions.

The chassis 114 further houses a rechargeable/replaceable battery pack for powering the robot's onboard systems including the sensors, the wheelbase 112, the touchscreen interface 116, the payment interface 118, etc. The robot 100 may be configured to autonomously navigate to and dock with a charging station to recharge. The robot 100 may be configured for wireless (inductive) charging of the on-board battery pack.

The robot 100 includes a controller (e.g., one or more computer processors, integrated circuits, systems-on-a-chip, including associated hardware and software) configured to control the robot autonomous operation of the robot 100 including the mobile vending operations, last-mile delivery operations, card issuance operations and ticket issuance operations described herein.

Figure 1B:
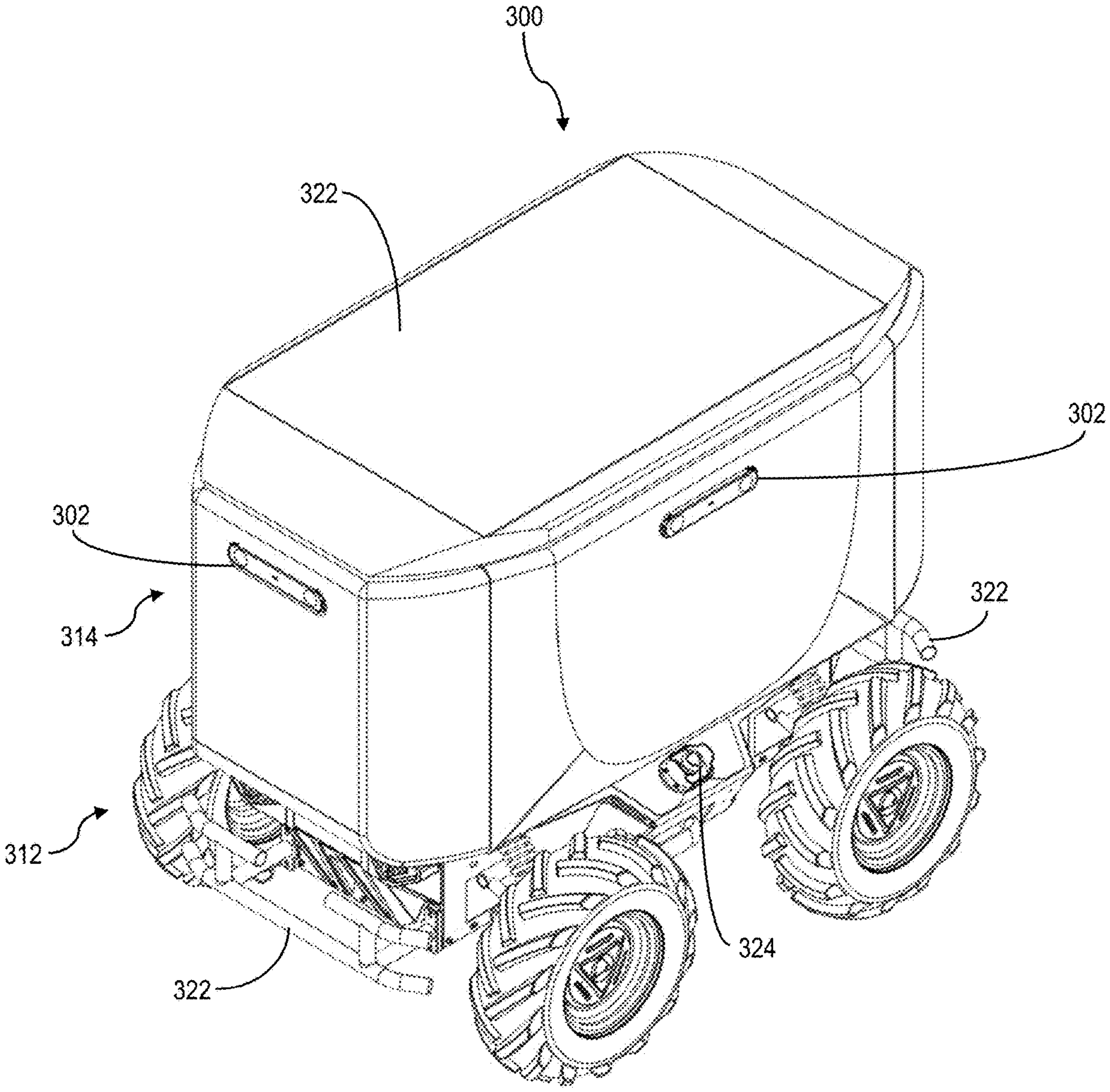
FIG. 1B is an autonomous mobile vending robot, according to another embodiment.
Figure 1C:
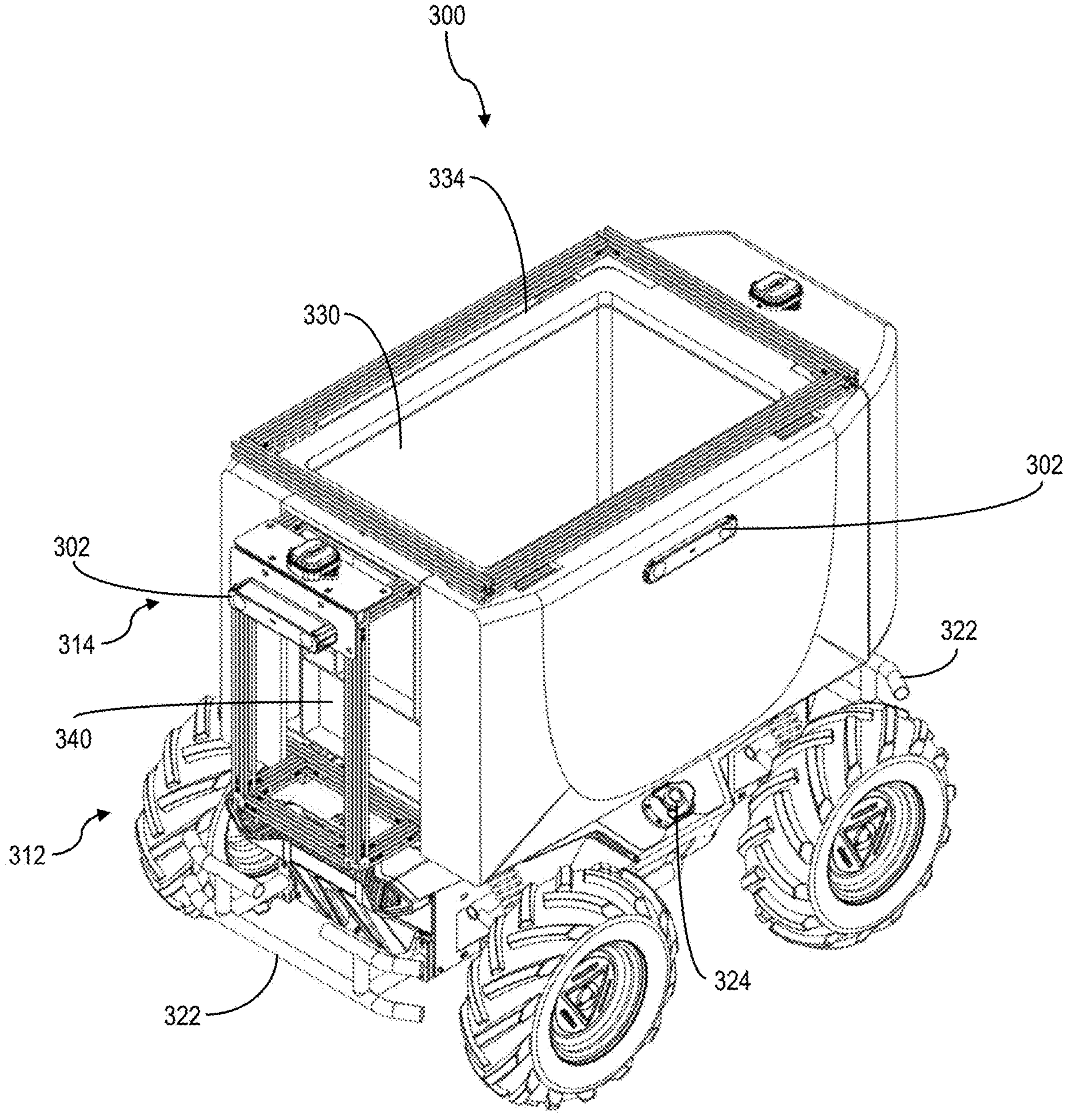
FIG. 1C is the autonomous mobile vending robot of FIG. 1B shown without a door.

Referring to FIGS. 1B-1C, shown therein is an autonomous mobile vending robot 300, according to another embodiment. The robot 300 is substantially similar to the robot 100 in FIG. 1A and includes a chassis 314 and a wheelbase 312.

The robot 300 includes a vision system comprising a plurality of sensors 302 (e.g., cameras, LIDAR sensors, depth sensors, proximity sensors) disposed on various external surfaces of the robot 300. According to some embodiments, additional sensors of the vison system may be positioned on front and rear bumpers 322 of the robot 300. The vision system generally senses the 360-degree environment around the robot 100 to generate a map of the environment to allow the robot 100 to autonomously navigate through the environment without colliding with other objects. According to various embodiments, the robot 300 may be configured with an existing map of an operating environment and the map is updated based on input from the vision system.

The robot 300 further includes location/positioning components (e.g., a GPS transceiver, a compass, gyroscopes, internal measurement units, accelerometers, etc.) to determine the absolute or relative location/position of the robot 300 in an environment. According to various embodiments, other application-specific sensors and systems can be added to expansion slots 340 in the chassis 314.

The chassis 314 houses a storage compartment 330 for securely storing items for mobile vending, dispensing and/or last mile delivery. The storage compartment 330 includes an opening 324 through which items are added into, and removed, from the storage compartment 330. A secure lockable door 322 covers the opening 324.

According to an embodiment, the robot 300 includes a barcode scanner or RFID scanner configured to scan a barcode/RFID tag on items as they are added and removed from the storage compartment. This provides for automatic inventory tracking of items in the storage compartment 330 and also provides a "checkout register" for billing in mobile vending transactions.

According to various embodiments, the interior of the storage compartment 330 is configured for storing, transporting and/or dispensing specific items. According to various embodiments, the storage compartment 330 is insulated, refrigerated or heated to regulate temperature of food or beverages in the storage compartment 330. According to some embodiments, the storage compartment 330 includes cartridges for storing and dispensing credit/gift cards. According to some embodiments the storage compartment 330 houses a printer and a roll of paper for printing tickets (e.g., lottery tickets, raffle tickets), receipts, etc.

According to various embodiments, the robot 300 includes additional sensors for user validation for vending/dispensing of certain restricted products (e.g., alcohol, recreational drugs, pharmaceuticals, etc.). For example, using an on-board camera, microphone and speaker, mobile vending transactions can also be recorded or streamed for a remote operator (e.g., a licensed bartender) to validate customer identification and verification for mobile vending and delivery of restricted products. According to another embodiment, the robot includes a card reader for scanning a user's identification card (e.g., a driver's license, passport, health card, etc.) to verify their identity and age; the card scanner may be coupled to the robot's onboard camera that is configured to use facial recognition technology to confirm the user's face matches the image on the identification card.

According to an embodiment, the robot 300 includes one or more emergency stop buttons 324 on one or more external surfaces of the chassis 314 and/or the wheelbase 312.

Mobile Vending Machine/Last Mile Delivery System

Figure 2:
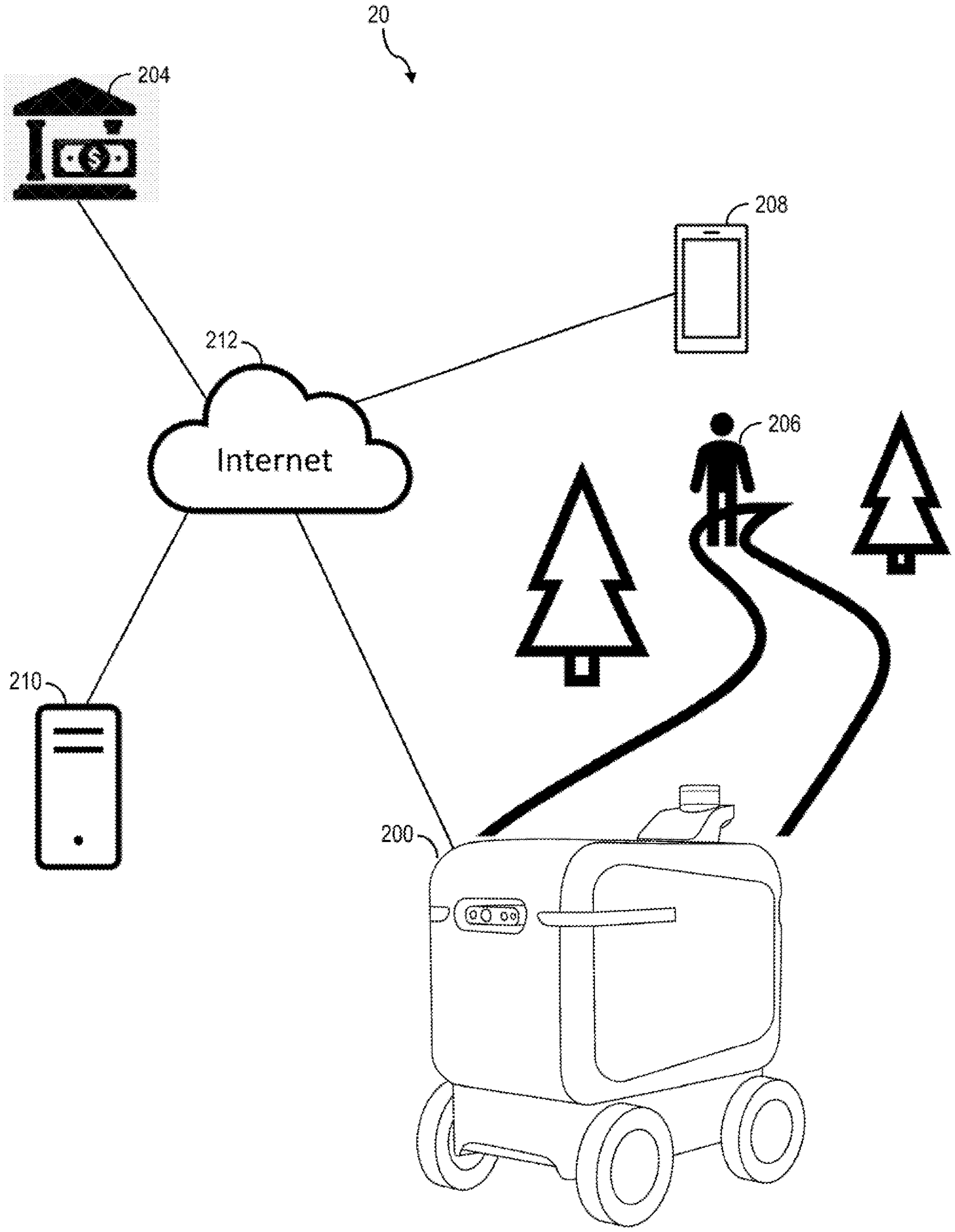
FIG. 2 is a diagram of an autonomous mobile vending system, according to an embodiment.

Referring to FIG. 2, illustrated therein is an autonomous mobile vending system 20, according to an embodiment. The system 20 includes an autonomous mobile vending robot 200. The robot 200 may be the robot 100 or the robot 300 in FIG. 1. The robot 200 carries items (e.g., food, beverages) to the user 206 to sell as a mobile point-of-sale or for "last mile" delivery of the items to the user 206. A user 206, operating a mobile device 208 (e.g., an internet-connected smartphone, tablet, laptop computer, or the like) can interact with the robot 200 to engage in point-of-sale transactions for the items carried by the robot 200.

The system 20 includes a PCI compliant cloud-based payments system 204 (e.g., DejaVoo™) for processing point-of-sale payments. The system 20 includes a backend system 210 (e.g., one or more servers, cloud servers, web-hosted applications) configured to manage a fleet of mobile vending robots 200.

The various components 200, 204, 208, 210 of the system 20 generally communicate and exchange information over a communications network 212 (i.e., the internet). The robot 200 includes wireless communication components (e.g., a WiFi modem and/or cellular 4G/5G modems) for connecting to the communications network 212. The robot 200 includes short-range communications components (e.g., Bluetooth modem and NFC) to connect to the user device 208 when in close physical proximity. The robot 200 further includes location/positioning components (e.g., a GPS transceiver). The user device 208 similarly has location/positioning components (e.g., a GPS transceiver), wireless communication components for communicating with the robot 200 directly (e.g., by short-range communications such as Bluetooth or NFC) or via the communications network 212.

According to various embodiments, the user 206 may be a client/customer operating the user device 208, for example, to summon the robot to the customer's location for a point-of-sale transaction, or to deliver an item that has been paid for earlier by the user 206, etc. According to other embodiments, the user 206 may be a retailer, a sales associate or the like, operating the user device 208 to configure/dispatch the robot 200 for mobile vending operations, last mile delivery operations, restocking items carried by the robot 102, to perform maintenance, etc.

According to some embodiments, the user device 208 is installed with an application specifically configured for interaction with the robot 200. For example, the mobile application is configured for summoning the robot, integration with the payment systems 204 to process point-of-sale payments, display and select items carried by the robot 200 and instruct the robot 200 to dispense the item. According to other embodiments, the user device 208 includes a browser application for accessing a website for interacting with the robot 200.

Exemplary mobile vending and last mile delivery operations are described below.

The robot 200 operates using an onboard autonomy software stack, allowing the robot to automatically navigate a given environment. During operations, the robot 200 can be pre-programmed to traverse a waypoint path (i.e., autonomous navigation through a large corporate commercial building, or retail mall), or the robot can be directed/summoned via the mobile app to specific GPS coordinates where the user device 208 is located. According to some embodiments, the robot uses one or more on-board sensors to identify the user device summoning the robot, for example, by using Bluetooth beacon location finding, near-field communications, etc. According to an embodiment, the robot includes a camera configured for facial recognition and identifies the user by facial matching to an identification card (e.g., a driver's license) or a "selfie" image uploaded by the user via the mobile app.

When interacting with the client or customer, the robot's screen interface directs the user through a stepped process for a mobile vending transaction or a mobile delivery operation. Depending on robot configuration (mobile vending machine, last-mile delivery), the screen is custom programmed to guide the user.

The user selects the desired solution onboard using the touch screen interface.

According to an embodiment, using the robot's touchscreen interface, secure storage compartment, and secure internet-connected communication system, the system 20 can allow customers 206 to "tap to pay" for products stored onboard the robot 200, and have the robot 200 then automatically open the secure storage compartment to dispense the purchased product.

The robot interacts in real time with the payment provider 204 (via Dejavoo System's Payment Processing SDK/backbone) and authenticates/validates the transaction as necessary.

Once validation is completed, a secured approval instruction is sent to the robot for dispensing of product.

The robot 200 opens the cover to the secure storage compartment to allow retrieval of the item purchased by the user. The item that is removed from the storage compartment may include a barcode/RF ID tag that is scanned by the robot's onboard scanner to log the item has been removed and update inventory. Once the item is removed, the robot 200 closes the storage compartment, and continues operation autonomously.

Mobile Credit and Gift Card Issuance

According to some embodiments, the robot 200 is configured for mobile credit card or gift card issuance using the same payments interface, but a modified chassis. In these embodiments, the secure storage compartment includes a card storage system for storing blank, programmable "pre-paid"-type physical credit cards for dispensing to users.

The user can complete a credit application via the robot's touchscreen interface. The touchscreen interface may display various pre-set authorized amounts to be loaded onto the card or allow the user to enter a desired amount to be loaded onto the care. The user validates their identity using the payment interface and onboard sensors/cameras, and, using the live-cellular connection, can have credit validated and confirmed by the payment provider 204. A pre-loaded credit card can then be immediately dispensed for use.

Similarly, according to other embodiments, gift cards for use at one or more retailers can be dispensed by the robot. These embodiments of the robot may be particularly useful when deployed indoors or outdoors in shopping centers or malls.

The card storage system is housed within the secure storage compartment and includes a rack for storing activatable cards onboard the robot 200. The card storage system further includes RFID and/or magnetic card-writing components for activating and programming the activatable cards with a preauthorized amount of funds when approved to do so by the payment provider 204. Activated cards are dispensed to the user through a slot in the robot 200 chassis.

During a card issuance operation, the robot is configured to monitor all steps and user interaction with the robot 200 recorded by on-board cameras and this information is linked to the transaction that is processed by the payment system 204 for full traceability. Failed transactions (e.g., a transaction that is rejected by the payment system 204) are also recorded for security and fraud prevention.

Mobile Lottery Ticket Dispensing

According to some embodiments, the robot 200 is configured for mobile lottery ticket dispensing. These embodiments may be particularly useful for dispensing lottery tickets, raffle tickets, or the like, at sporting events, malls, etc.

The user can purchase tickets via the robot's touchscreen interface. The touchscreen interface may display prices for single or groups of tickets or allow the user to enter a desired amount of tickets for purchase. The user validates their identity using the payment interface and onboard sensors/cameras, and, using the live-cellular connection, the purchase transaction for the tickets can be confirmed by the payment system 204. A ticket is then dispensed through a slot in the chassis.

For ticket dispensing operations, the storage compartment includes a "secure" printer validated and approved by the relevant gaming authorities in the jurisdiction where the robot is deployed for mobile lottery ticket dispensing. The printer is securely, and substantially immovably affixed to the chassis. An integrated security system is connected to the printer to permanently disable the printer if the printer is disconnected or tampering is detected.

The storage compartment further houses a pre-approved roll of secure lottery paper for printing of tickets. A tracking device within the chassis monitors the feeding of the paper into the printer, to check for paper jams, paper changes, etc. According to some embodiments, the robot includes a paper changer for replacing the ticket paper in the printer with a fresh roll of paper stored in the storage compartment.

The robot is configured to verify the identity of users purchasing a lottery ticket to ensure they are authorized to play the lottery in the jurisdiction the robot is deployed. For example, the robot may be configured not to issue a ticket to a minor or a non-resident. According to an embodiment, the robot includes a card reader for scanning a user's identification license to verify their identity and residence; the card reader may be coupled to the robot's onboard camera that is configured to use facial recognition technology to confirm the user's face matches the image on the identification card. According to another embodiment, a video or images of the user's face may be streamed to a remote operator for manual authorization of the transaction and issuing of the ticket.

Data Platform

The systems and robots described herein collect and process user and environmental data for mobile vending operations, last-mile delivery operations, mobile credit/gift card issuance and mobile ticket issuance. Provisioning of user or environmental data that is captured and stored (i.e., data aggregation) from on-board sensors, cameras and data capture devices or mobile vending robots allows for development of data warehouse modelling for client-specific applications.

Referring to FIG. 4, shown therein is a data system 40, according to an embodiment. The data system 40 includes a backend server 410 that manages robots 400*a*, 400*b* operating in the field and also hosts applications 402, 404, 408, 411 as described below. Generally, the server 410 receives and processes data (e.g., sensor/camera data, navigation/location data, points-of-interest data, user interaction data, sales/transaction data, item inventory data, battery status, etc.) from a plurality of mobile vending robots 400*a*, 400*b* operating in the field.

The backend server 410 hosts a fleet manager 411 application configured for tracking and managing robots 400*a*, 400*b* operating in the field. It should be noted that FIG. 4 shows two robots 400*a*, 400*b*, but the system 40 may include more or fewer robots than shown. The fleet manager 441 tracks, in real time, the operations (e.g., mobile vending, card issuance, ticket issuance) and status (e.g., location, inventory level, battery level, etc.) of the robots 400*a*, 400*b*.

The fleet manager 411 is further configured to assign scheduled tasks to specific robots and route them accordingly (e.g., the robot 400*a* must delivery product X to location Y by taking route Z; the robot 400*b* is tasked with mobile card issuance between locations A and B by taking route C). The fleet manager 411 receives orders (e.g., mobile vending orders, last-mile-delivery orders, card issuance orders or ticket issuance orders) from the user interface 408 and generates delivery schedules and routes.

The backend 410 is further configured to generate access codes. An access code identifies a particular order/transaction and the end user placing the order. The access code may be an alphanumeric code or a QR code. Access codes are used internally by the system 40 for tracking orders. Access codes are also sent to user devices 208 via the user interface 408 for users to access items from the secure storage compartment in the robots 400*a*, 400*b* in last-mile delivery and mobile vending operations. An example is described below with reference to FIG. 2.

A user 206 uses an application on their user device 208 to request delivery of an item at a location. An access code for the transaction is generated on the backend 210, and sent to the user device 208. A robot 200 carrying the item is dispatched to the location. When the robot 200 arrives at the location, the user 206 displays the access code on the screen of the user device 208 and points the screen at a camera/sensor on the robot 200. The robot 200 transmits the access code to the backend 210 which authorizes the robot 200 to unlock and open the secure storage compartment allowing the user 206 to retrieve the item from therein.

Figure 3:
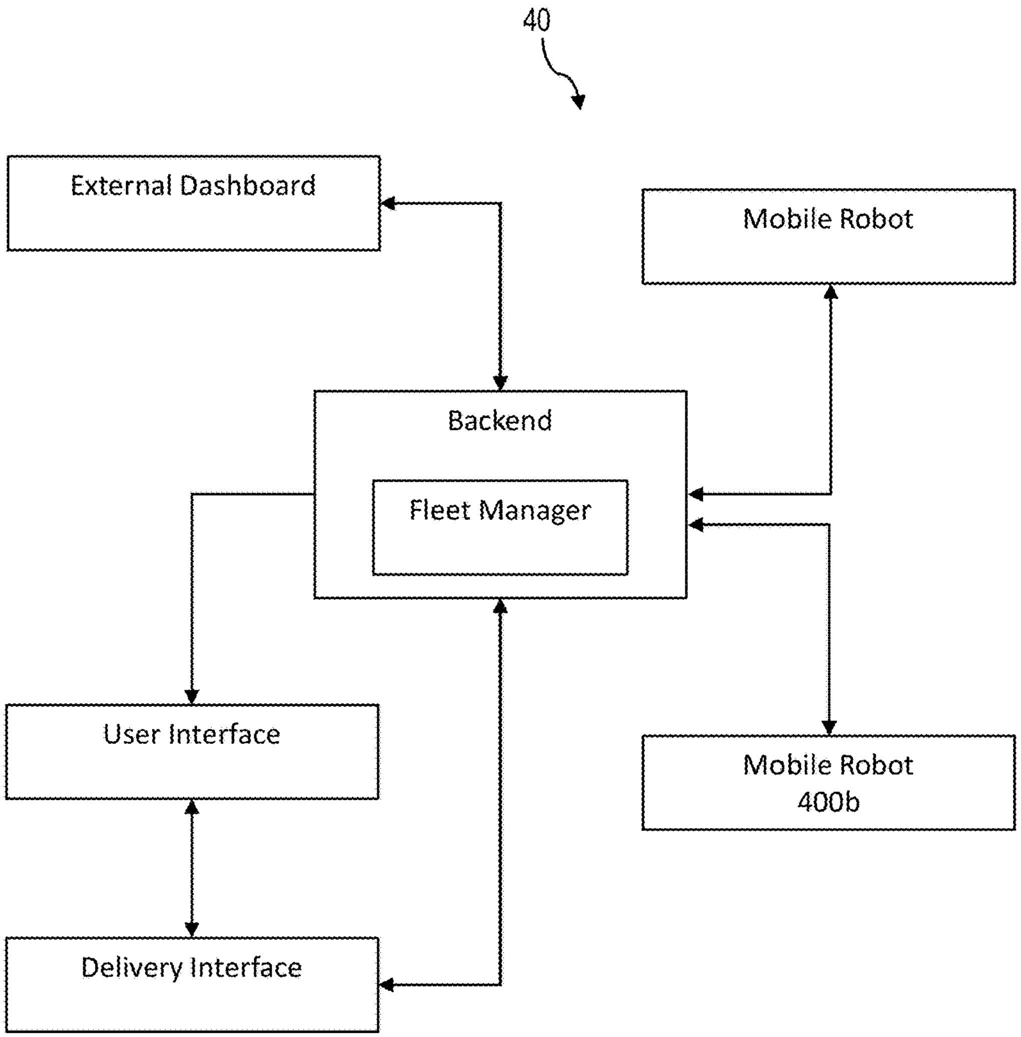
FIG. 3 is a diagram of a data system, according to an embodiment.

Referring to FIG. 3, the backend 410 hosts a user interface application 408. The user interface 408 is configured to receive user and order information input through user devices 208 and create orders and routing (e.g., user X needs product Y sent to location Z). The user interface 408 is also configured to present access codes, as described above.

The backend 410 hosts a delivery interface application 404. The delivery interface 404 is a centralized delivery management application for clients/operators that receives orders from the user interface 408 and calls on the backend 410 fleet manager 411 to manage the robot fleet to schedule and execute deliveries.

The backend 410 hosts an external dashboard application 402 for presenting data insights to clients and operators employing mobile vending robots 400*a*, 400*b*. The external dashboard 402, is configured to process camera/sensor data and navigation/location data aggregated by the server 410 to generate data insights that may be useful for clients/operators. For example, sales/transaction data and navigation/location data may be used to generate a map of the robot's operating environment indicating physical locations (points-of-interest) where point-of-sale mobile vending transactions have occurred. In another example, sales/transactions data and item inventory data may be used to generate insights about how much inventory of a particular item a robot 400*b* should carry and how frequently the robot 400*b* must be restocked for mobile vending operations.

Personal data (including facial images, driver's license information, etc.) captured by the robot may be anonymized and utilized by AI and ML to improve the system 40 operation.

While the above description provides examples of one or more apparatus, methods, or systems, it will be appreciated that other apparatus, methods, or systems may be within the scope of the claims as interpreted by one of skill in the art. What is claimed is systems and methods as generally and as specifically described herein.

The invention claimed is:

1. A mobile vending robot comprising:

a first plurality of sensors configured for directing the robot to autonomously navigate an environment;

a chassis including a secure storage compartment for storing items;

a touchscreen interface for displaying information to a user and receiving user input;

a payment interface for connecting to a payment system to process point-of-sale transactions; and at least a second sensor configured for identifying a customer, wherein the robot is configured to:

weigh an energy consumption cost against a sensory input benefit for each sensor in the first plurality of sensors;

dynamically switch off one or more sensors in the first plurality of sensors when the energy consumption cost of the one or more sensors exceeds the sensory input benefit of the one or more sensors;

fuse signals from at least a subset of the first plurality of sensors to provide a minimum sensory input to autonomously navigate the environment without colliding with objects;

receive a signal from a customer device summoning the robot to the customer, the signal including an identifier of the customer and a location;

navigate to the location;

identify the customer by the second sensor;

receive customer input via the touchscreen interface for a point of sale-transaction;

transmit payment information received via the payment interface to the payment system; and receive confirmation of payment from the payment system.

2. The mobile vending robot of claim 1, further configured to:

provide access to the storage compartment upon receiving the confirmation of payment.

3. The mobile vending robot of claim 1, wherein the secure storage compartment is insulated and further comprises a refrigeration system or a heating system.

4. The mobile vending robot of claim 1, wherein each item includes an RFID tag and the robot further comprises a RFID scanner configured to scan the RFID tag.

5. The mobile vending robot of claim 4, wherein the robot is further configured to:

confirm an item is removed from the storage compartment by scanning the RFID tag on the item; and end access to the storage compartment.

6. The mobile vending robot of claim 5, further configured to update an inventory for the item.

7. The mobile vending robot of claim 1, further comprising a card storage system housed within the secure storage compartment, the card storage system comprising:

a rack for storing activatable cards; and magnetic and/or RFID card-writing components for activating and programming an activatable card with a pre-authorized amount of funds.

8. The mobile vending robot of claim 7, wherein the robot is further configured to:

activate and program the activatable card with the pre-authorized amount of funds when approved by the payment system; and dispense the activated card through a slot in the chassis.

9. The mobile vending robot of claim 1, wherein the secure storage compartment stores:

a printer substantially immovably affixed to the chassis; and a roll of ticket paper installed in the printer.

10. The mobile vending robot of claim 9, further comprising a security system connected to the printer and configured to permanently disable the printer if the printer is disconnected or tampering is detected.

11. The mobile vending robot of claim 9, further configured to:

print a ticket when approved by the payment system; and dispense the ticket through a slot in the chassis.

12. The mobile vending robot of claim 1, further comprising:

a card reader configured for scanning an identification card, and the at least second sensor comprises a camera configured for facial recognition to confirm a user's face captured by the camera matches an image on the identification card.

13. The mobile vending robot of claim 1, wherein the first plurality of sensors comprise cameras, LIDAR sensors, depth sensors, proximity sensors or a combination thereof.

14. The mobile vending robot of claim 1, wherein the at least second sensor comprises one or more of a camera, a Bluetooth receiver and a NFC receiver.

15. The mobile vending robot of claim 1, wherein the at least second sensor is a camera and the robot is further configured to stream video and/or images captured by the camera to a remote operator for manual visual inspection.

16. The mobile vending robot of claim 1, wherein the at least second sensor is a camera configured for scanning QR codes and the robot is further configured to transmit the QR code to a backend system for authentication.

17. The mobile vending robot of claim 16, further configured to:

provide access to the storage compartment upon receiving authentication from the backend system.

* * * * *